(12) United States Patent
Hsu et al.

(10) Patent No.: US 9,258,872 B2
(45) Date of Patent: Feb. 9, 2016

(54) STREETLAMP FAULT DETECTION APPARATUS AND STREETLAMP FAULT DETECTION METHOD THEREOF

(71) Applicant: INSTITUTE FOR INFORMATION INDUSTRY, Taipei (TW)

(72) Inventors: Shao-Hsuan Hsu, New Taipei (TW); Chi-Cheng Chuang, Kaohsiung (TW); Ji-Tsong Shieh, New Taipei (TW)

(73) Assignee: Institute For Information Industry, Taipei (TW)

( * ) Notice: Subject to any disclaimer, the term of this patent is extended or adjusted under 35 U.S.C. 154(b) by 612 days.

(21) Appl. No.: 13/659,094

(22) Filed: Oct. 24, 2012

(65) Prior Publication Data

US 2014/0067290 A1 Mar. 6, 2014

(30) Foreign Application Priority Data

Sep. 5, 2012 (TW) .............................. 101132288 A

(51) Int. Cl.
*G01R 31/44* (2006.01)
*G01R 27/16* (2006.01)
*H05B 37/03* (2006.01)

(52) U.S. Cl.
CPC ............... *H05B 37/032* (2013.01); *Y02B 20/72* (2013.01)

(58) Field of Classification Search
CPC .... H05B 37/034; H05B 37/032; H05B 37/03; H05B 37/02; H05B 37/00; H05B 33/08; G01R 31/44; G01R 31/00; G01R 27/16; G01R 19/00
See application file for complete search history.

(56) References Cited

U.S. PATENT DOCUMENTS

| | | | |
|---|---|---|---|
| 7,362,103 B2 | 4/2008 | Ger et al. | |
| 7,876,103 B2 | 1/2011 | Mihai et al. | |
| 2008/0164822 A1 | 7/2008 | Serebryanov et al. | |
| 2009/0134878 A1 | 5/2009 | Bucks et al. | |
| 2010/0123573 A1 | 5/2010 | Cawthorne et al. | |
| 2010/0244844 A1 | 9/2010 | Veroni | |

FOREIGN PATENT DOCUMENTS

| | | |
|---|---|---|
| CN | 101217843 A | 7/2008 |
| CN | 101734162 A | 6/2010 |

OTHER PUBLICATIONS

Xiaoxi et al., A Novel Anti-Theft and Detection Method of Street Lamp Power Cables, Jul. 17-19, 2010, Proceedings of the 2010 International Conference on Modelling, Identification and Control, Okayama, Japan, pp. 76-81.*
Office Action to the corresponding TW Patent Application No. 101132288 rendered by the Taiwan Intellectual Property Office (TIPO) on Sep. 24, 2014.
CN Patent Application No. 201310050604.2, Office Action dated Feb. 2, 2015.

* cited by examiner

*Primary Examiner* — Toan Le
(74) *Attorney, Agent, or Firm* — Skaar Ulbrich Macari, P.A.

(57) ABSTRACT

A streetlamp fault detection apparatus and a streetlamp fault detection method thereof are provided. The streetlamp fault detection apparatus is coupled to a streetlamp loop, and stores an impedance condition table defining a reference impedance range and a non-reference impedance range. The streetlamp fault detection apparatus measures a total impedance value of the streetlamp loop in a measurement period, determines that the streetlamp loop is in a normal operating state if the total impedance value stably falls within the reference impedance range in the measurement period, and determines that the streetlamp loop is in a fault state if the total impedance value falls into the non-reference impedance range in the measurement period.

14 Claims, 7 Drawing Sheets

STREETLAMP FAULT DETECTION APPARATUS AND STREETLAMP FAULT DETECTION METHOD THEREOF

This application claims priority to Taiwan Patent Application No. 101132288 filed on Sep. 5, 2012, which is hereby incorporated by reference in its entirety.

CROSS-REFERENCES TO RELATED APPLICATIONS

Not applicable.

BACKGROUND OF THE INVENTION

1. Field of the Invention

The present invention relates to a streetlamp fault detection apparatus and a streetlamp fault detection method thereof. In particular, the streetlamp fault detection apparatus and the streetlamp fault detection method thereof of the present invention detect a fault state of streetlamps in a streetlamp loop by measuring a total impedance value of the streetlamp loop and comparing the total impedance value to an impedance condition table.

2. Descriptions of the Related Art

With the rapid development of urban areas, the demands for night lighting increase correspondingly. Accordingly, lighting engineering has become increasingly important. Streetlamps are usually disposed at roadsides or in public places for lighting purposes to prevent traffic accidents and crimes. Streetlamps are usually controlled through a remote server which controls the distribution box that powers the streetlamps; the streetlamps are turned on at night and turned off at dawn.

However, due to the large number of streetlamps and the need for manual inspection of the streetlamps, subsequent maintenance of the streetlamps is very time and labor consuming, and thus, makes it difficult to find the fault state of any streetlamp in a timely manner. If a streetlamp fails but cannot be repaired in a timely manner, traffic problems are likely to arise and cause blind areas for public security. Furthermore, even though the installation of a sensor on each streetlamp to monitor the state of the streetlamp through real-time communication can uncover faulty streetlamps in a timely manner, the installation of the sensors is difficult and leads to increased costs.

Accordingly, it is important to provide a detection apparatus that can be installed simply, have a low cost and can detect a fault state of a streetlamp in real time.

SUMMARY OF THE INVENTION

An objective of the present invention is to provide a streetlamp fault detection apparatus and a streetlamp fault detection method thereof. The streetlamp fault detection apparatus of the present invention can be installed in or near a distribution box of an area, and determine a fault state of streetlamps in a streetlamp loop by measuring a total impedance value of the streetlamp loop in real time and comparing the total impedance value against an impedance condition table. Furthermore, when the streetlamp loop is in a fault state, the streetlamp fault detection apparatus of the present invention can determine a fault reason and a fault amount of the streetlamps according to the total impedance value and transmit the determination results to a remote server. Thereby, as compared to the prior art, the streetlamp fault detection apparatus of the present invention not only can be installed more simply and have a lower cost but can also detect a fault state of the streetlamps in real time.

To achieve the aforesaid objective, the present invention provides a streetlamp fault detection apparatus, which is coupled to a streetlamp loop and comprises a storage, a measurer and a processor. The storage is configured to store an impedance condition table. The impedance condition table defines a reference impedance range and a non-reference impedance range. The measurer is configured to measure a total impedance value of the streetlamp loop in a measurement period. The processor is electrically connected to the storage and the measurer. The processor determines that the streetlamp loop is in a normal operating state if the total impedance value stably falls within the reference impedance range in the measurement period. The processor determines that the streetlamp loop is in a fault state if the total impedance value falls into the non-reference impedance range in the measurement period.

Furthermore, the present invention further provides a streetlamp fault detection method for use in a streetlamp fault detection apparatus. The streetlamp fault detection apparatus is coupled to a streetlamp loop and comprises a storage, a measurer and a processor electrically connected to the storage and the measurer. The streetlamp fault detection method comprises the following steps of: (a) storing, by the storage, an impedance condition table defining a reference impedance range and anon-reference impedance range; (b) measuring, by the measurer, a total impedance value of the streetlamp loop in a measurement period; (c) after the step (b), determining, by the processor, that the streetlamp loop is in a normal operating state if the total impedance value stably falls within the reference impedance range in the measurement period; and (d) after the step (b), determining, by the processor, that the streetlamp loop is in a fault state if the total impedance value falls into the non-reference impedance range in the measurement period.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

In the following description, the present invention will be explained with reference to embodiments thereof. However, these embodiments are not intended to limit the present invention to any specific environment, applications or particular implementations described in these embodiments. Therefore, the description of these embodiments is only for the purpose of illustration rather than to limit the present invention. In the following embodiments and attached drawings, elements not directly related to the present invention are omitted from depiction; and the dimensional relationships among individual elements in the attached drawings are illustrated only for ease of understanding, but not to limit the actual scale.

Figure 1:
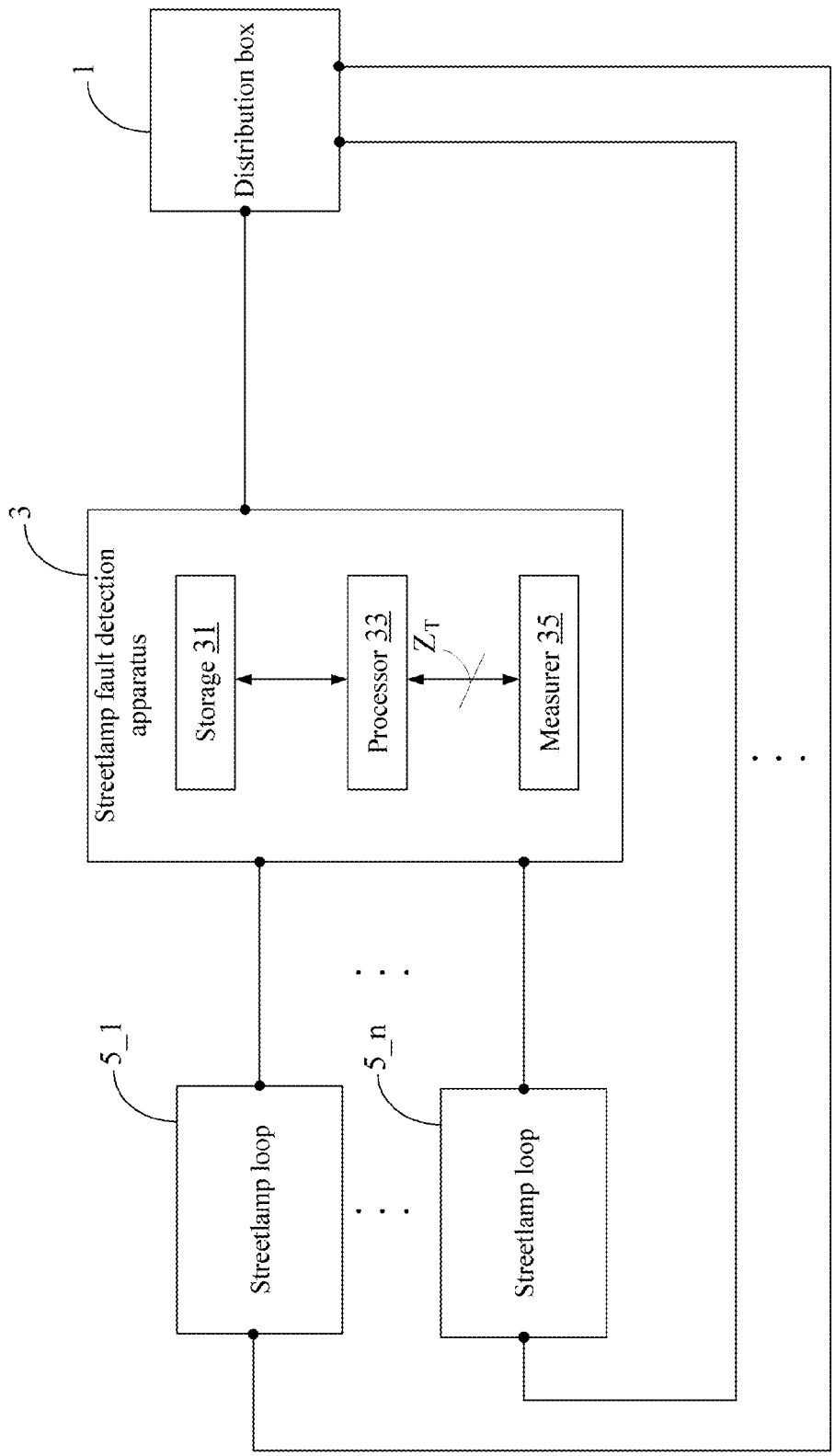
FIG. 1 is a schematic view of a streetlamp system according to the first embodiment of the present invention.

The first embodiment of the present invention is as shown in FIG. 1, which depicts a streetlamp system. The streetlamp system comprises a distribution box 1, a streetlamp fault detection apparatus 3 and a plurality of streetlamp loops 5_1~5_n. The distribution box 1 is electrically connected to the streetlamp loops 5_1~5_n, and is controlled by a remote server (not shown) to supply an alternating current (AC). The streetlamp fault detection apparatus 3 is electrically connected between the distribution box 1 and each of the streetlamp loops 5_1~5_n to detect whether each of the streetlamp loops 5_1~5_n is in a normal operating state. Furthermore, the streetlamp fault detection apparatus 3 may also be controlled by the remote server, and is installed directly in or near the distribution box 1.

The streetlamp fault detection apparatus 3 comprises a storage 31, a processor 33 and a measurer 35. The storage 31 stores an impedance condition table for each of the streetlamp loops 5_1~5_n, and the impedance condition table defines a reference impedance range and a non-reference impedance range. The measurer 35 measures a total impedance value $Z_T$ of each of the streetlamp loops 5_1~5_n in a measurement period. Specifically, based on the relationships between the voltage, the total current and the total impedance value $Z_T$, the measurer 35 observes the total impedance value $Z_T$ of each of the streetlamp loops 5_1~5_n in the measurement period (e.g., 10 minutes, 20 minutes, etc.) at a sampling rate of obtaining the total impedance value $Z_T$ of each of the streetlamp loops 5_1~5_n per minute. Furthermore, the observation frequency may be preset in the streetlamp fault detection apparatus 3, or may be set or changed by the remote server. For example, the streetlamp fault detection apparatus 3 observes the total impedance value $Z_T$ of each of the streetlamp loops 5_1~5_n once per hour from 6 P.M. of each day to 6 A.M. of the next day.

The processor 33 is electrically connected to the storage 31 and the measurer 35. The processor 33 determines whether each of the streetlamp loops 5_1~5_n is in the normal operating state according to the reference impedance range and the non-reference impedance range defined by the impedance condition table. In detail, using streetlamp loop 5_1 as an example, if the total impedance value $Z_T$ of the streetlamp loop 5_1 stably falls within the reference impedance range in the measurement period, then the processor 33 determines that the streetlamp loop 5_1 is in a normal operating state. Conversely, if the total impedance value $Z_T$ of the streetlamp loop 5_1 falls into the non-reference impedance range in the measurement period, then the processor 33 determines that the streetlamp loop 5_1 is in a fault state.

Figure 2:
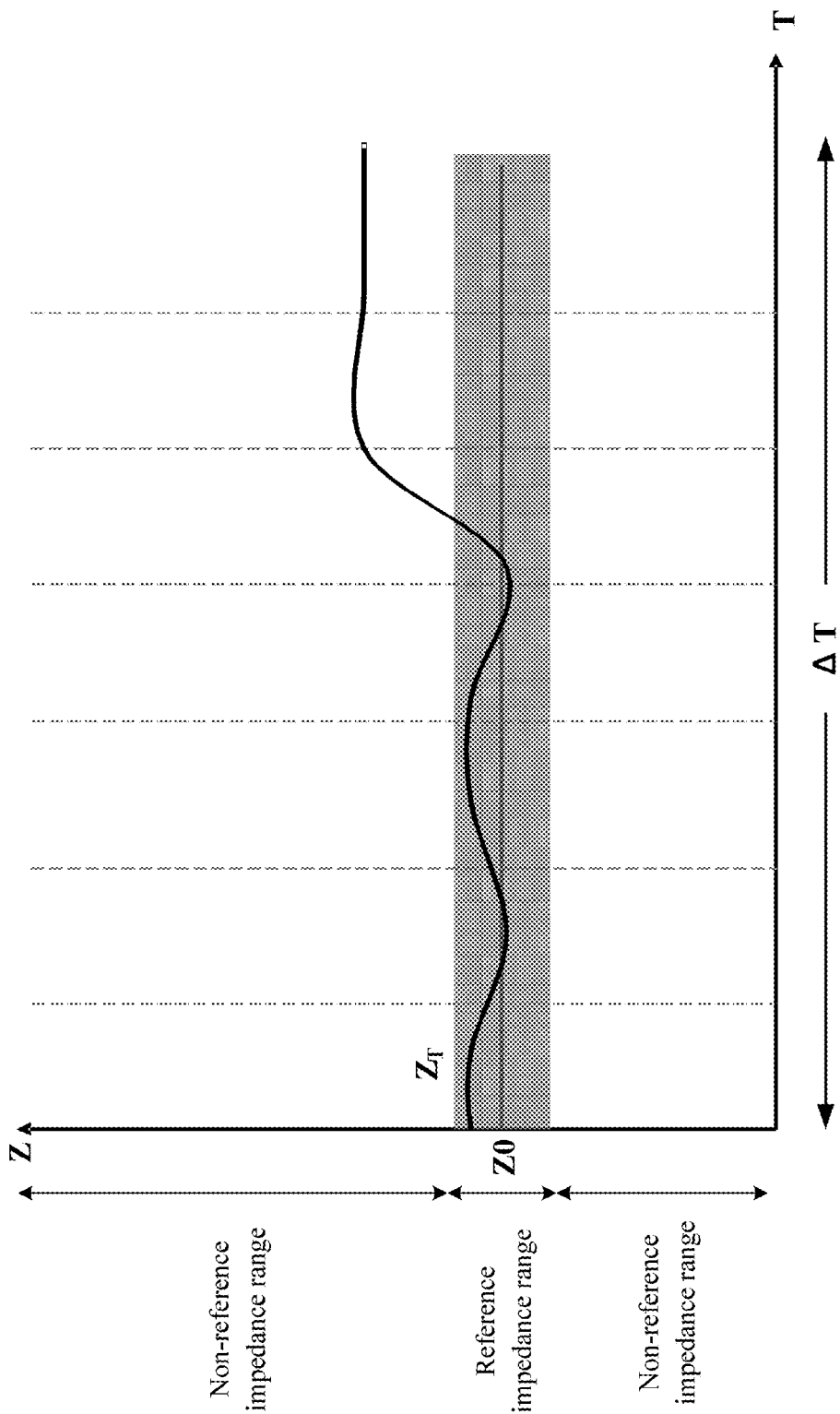
FIG. 2 depicts the variation of a total impedance value $Z_T$ between a reference impedance range and a non-reference impedance range in the first embodiment of the present invention.

For example, as shown in FIG. 2, a horizontal axis represents the time T, and a vertical axis represents the impedance value Z. The reference impedance range is constituted by a reference impedance value Z0 plus/minus an error tolerance value (i.e., Z0±Z0×e % ohms), where Z0×e % represents the error tolerance value. The non-reference impedance range is a range outside the reference impedance range. The reference impedance value Z0 can be obtained according to a streetlamp amount of the streetlamp loop 5_1 and an impedance value of each streetlamp when leaving the factory. In this example, the total impedance value $Z_T$ does not stably fall within the reference impedance range but, finally, stably falls within the non-reference impedance range in the measurement period ΔT; and therefore, the processor 33 can determine that the streetlamp loop 5_1 is in the fault state according to this. It shall be noted that the term "stably" used herein means that the total impedance value $Z_T$ tends to become stable after variations.

Furthermore, if the total impedance value $Z_T$ of the streetlamp loop 5_1 stably falls within the reference impedance range in the measurement period ΔT, then the processor 33 can modify the reference impedance value Z0 according to the total impedance value $Z_T$. For example, the processor 33 may take an average of the total impedance value $Z_T$ and the reference impedance value Z0 as a new reference impedance value Z0, and update the impedance condition table as well as the reference impedance range and the non-reference impedance range thereof.

Figure 3:
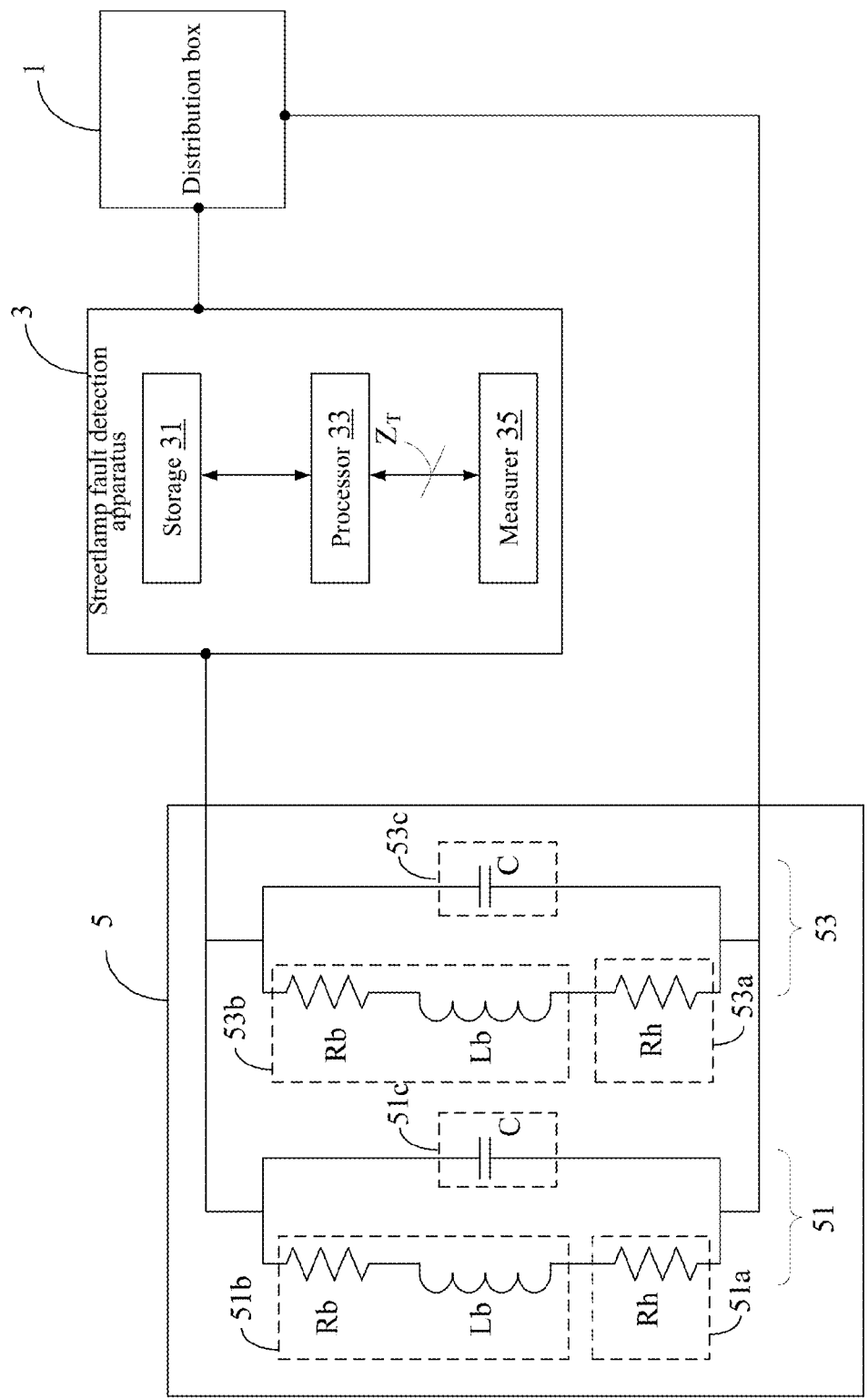
FIG. 3 is a schematic view of a streetlamp system according to the second embodiment of the present invention.

The second embodiment of the present invention is as shown in FIG. 3. This embodiment provides more specific description on the basis of the first embodiment. Due to the limitation of the page size and to more clearly explain the technical contents of the present invention, only a streetlamp loop 5 and streetlamps 51, 53 thereof are depicted in FIG. 3. However, those of ordinary skill in the art can readily appreciate that the streetlamp loop may comprise more than two streetlamps in practical applications and appreciate how to detect the fault state of such a streetlamp loop based on the description of this embodiment.

As shown in FIG. 3, the streetlamp loop 5 has two streetlamps 51, 53 connected in parallel. The streetlamp 51 comprises a light source 51a, a ballast 51b and a capacitor 51c, while the streetlamp 53 comprises a light source 53a, a ballast 53b and a capacitor 53c. The light source 51a has an equivalent resistor Rh; the ballast 51b has an equivalent resistor Rb and an equivalent inductor Lb; and the capacitor 51c has an equivalent capacitor C. Likewise, the light source 53a has an equivalent resistor Rh; the ballast 53b has an equivalent resistor Rb and an equivalent inductor Lb; and the capacitor 53c has an equivalent capacitor C. It shall be appreciated that the resistance value of the equivalent resistor Rh, the resistance value of the equivalent resistor Rb, the reactance value of the equivalent inductor Lb and the reactance value of the equivalent capacitor C can be obtained through measurement before delivery of the streetlamps 51, 53 or obtained according to specifications of internal electronic components.

When the streetlamp loop 5 is in the fault state, the processor 33 determines a fault reason and a fault amount of the streetlamps 51, 53 according to a fault condition table. The fault reason may be a light source short-circuit fault, a light source open-circuit fault, a capacitor open-circuit fault, a ballast fault or an overpower fault. For example, if the resistance value of the equivalent resistor Rh is 200 ohms, the resistance value of the equivalent resistor Rb is 100 ohms, the reactance value of the equivalent inductor Lb is 300 ohms and the reactance value of the equivalent capacitor C is −100 ohms, then the processor 33 calculates the resistance value R, the reactance value X and the impedance value Z ($z=\sqrt{R^2+X^2}$) of the streetlamp loop 5 according to various possible fault reasons to generate the fault condition table as shown in a table 1.

TABLE 1

| Condition | Streetlamp 1 | Streetlamp 2 | Resistance value R | Reactance value X | Impedance value Z |
|---|---|---|---|---|---|
| 0 | Normal | Normal | 130.7 | 100 | 164.6 |
| 1 | Light source open-circuit | Normal | 300 | 100 | 316.2 |
| 2 | Light source short-circuit | Normal | 87.5 | 112.5 | 142 |
| 3 | Capacitor open-circuit | Normal | 147.5 | 122.9 | 192 |
| 4 | Light source short-circuit | Capacitor open-circuit | 73.1 | 124.4 | 144.3 |
| 5 | Light source open-circuit | Capacitor open-circuit | 300 | 200 | 360.5 |
| 6 | Light source open-circuit | Light source short-circuit | 100 | 200 | 223.6 |
| 7 | Light source short-circuit | Light source short-circuit | 20 | 100 | 101 |
| 8 | Capacitor open-circuit | Capacitor open-circuit | 150 | 150 | 212.1 |
| 9 | Light source open-circuit | Light source open-circuit | ∞ | ∞ | ∞ |

Figure 4:
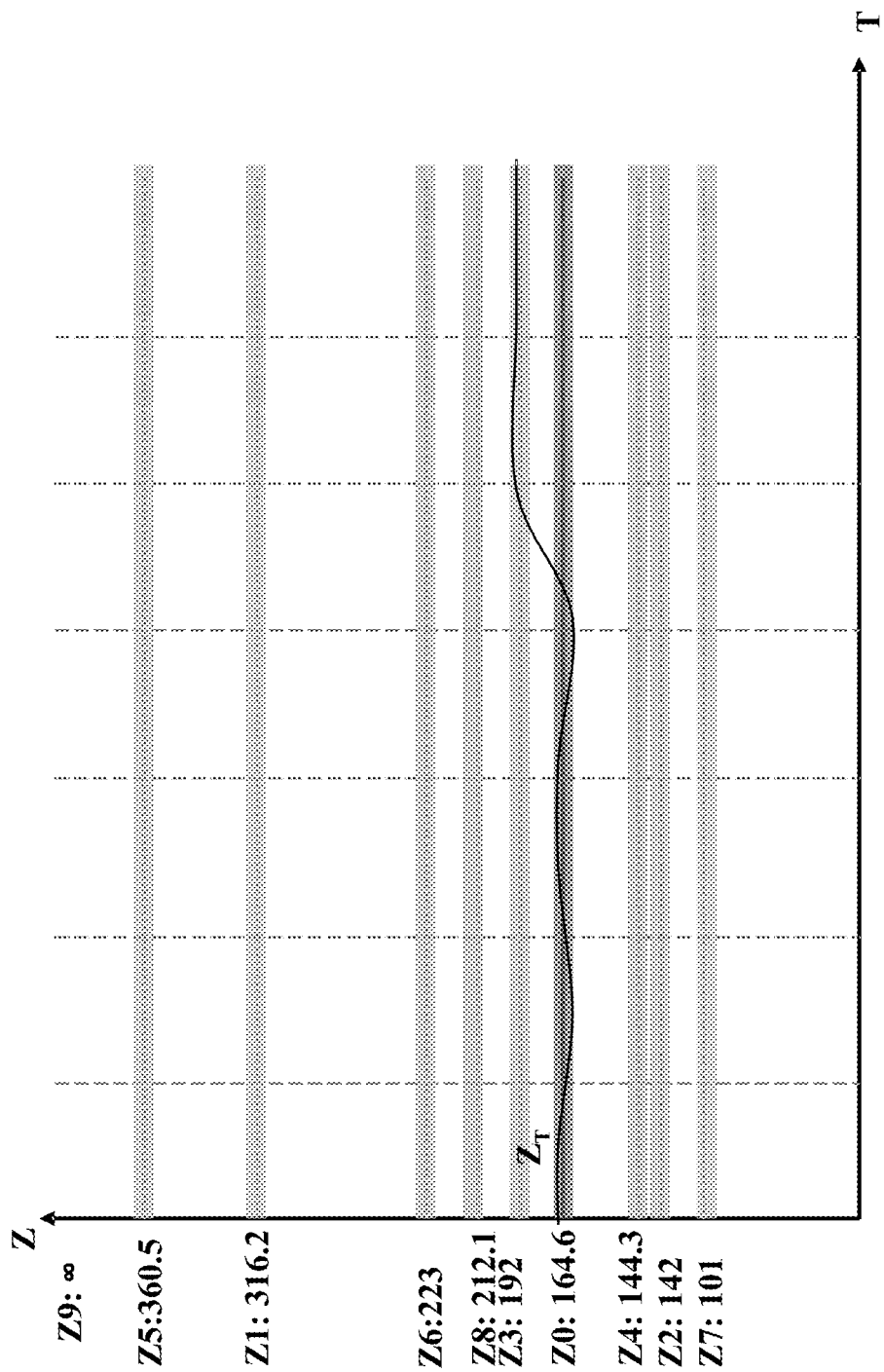
FIG. 4 depicts the variation of a total impedance value $Z_T$ between a reference impedance range and fault impedance ranges in the second embodiment of the present invention.

According to table 1, when the streetlamp loop is in the fault state, the fault reason includes at least one of the light source short-circuit fault, the light source open-circuit fault and the capacitor open-circuit fault. The reference impedance range and the non-reference impedance range are defined according to the total impedance value Z. As shown in FIG. 4, the reference impedance range is constituted by a reference impedance value of 164.6 ohms and an error tolerance value of 0.82 ohms (i.e., 164.6±0.82 ohms) In FIG. 4, Z0~Z9 represent the impedance values corresponding to the conditions in the table 1 respectively. When the total impedance value $Z_T$ stably falls within a range of 164.6±0.82 ohms (i.e., the reference impedance range), the processor 33 determines that the streetlamp loop 5 is in the normal operating state. It shall be appreciated that the AC supplied by the distribution box 1 usually has a fluctuation range (e.g., 0.5%), so the error tolerance value (i.e., 164.6×0.5% ohms) is set in consideration of the fluctuation. The error tolerance value will vary with the fluctuation range of the AC supplied by distribution boxes in individual areas.

Furthermore, in this embodiment, the non-reference impedance range (i.e., the range outside the reference impedance range) further comprises a plurality of fault impedance ranges, which are 316.2±316.2×0.5% ohms, 142±142×0.5% ohms, 192±192×0.5% ohms, 144.3±144.3×0.5% ohms, 360.5±360.5×0.5% ohms, 223.6±223.6×0.5% ohms, 101±101×0.5% ohms and 212.1±212.1×0.5% ohms respectively.

As shown in FIG. 4, the total impedance value $Z_T$ falls within the non-reference impedance range in the measurement period ΔT, so the processor 33 determines that the streetlamp loop 5 is in the fault state. Meanwhile, the total impedance value $Z_T$ finally stably falls within the fault impedance range (192±0.82 ohms) of the condition 3, so according to the table 1, the processor 33 can further determine that the fault reason is the capacitor open-circuit fault occurring in one of the streetlamps 51, 53 with the other of the streetlamps 51, 53 in the normal operating state. Thereby, according to the table 1, the processor 33 can determine the fault reason and the fault amount of the streetlamps by determining whether the total impedance value stably falls within one of the fault impedance ranges when the streetlamp loop is in the fault state.

On the other hand, when the streetlamp loop is in the fault state, the processor 33 determines that the fault reason includes the ballast fault if the total impedance value $Z_T$ varies between two of the reference impedance range and the fault impedance ranges. For example, if a fault occurs in the ballast 51b, then the AC power will be supplied to the light source 51a intermittently to cause flickers of the light source 51a and, as a result, the total impedance value $Z_T$ measured by the measurer 35 varies between two ranges. In other words, if the total impedance value $Z_T$ fails to stably fall within the reference impedance range or the fault impedance ranges, then the fault occurs in the ballast of at least one of the streetlamps 51, 53.

Furthermore, if the total impedance value $Z_T$ does not fall within the fault impedance ranges, then the processor 33 determines that the fault reason includes the overpower fault. In this case, the abstraction or leakage of electricity may occur in the streetlamp loop 5.

Figure 5:
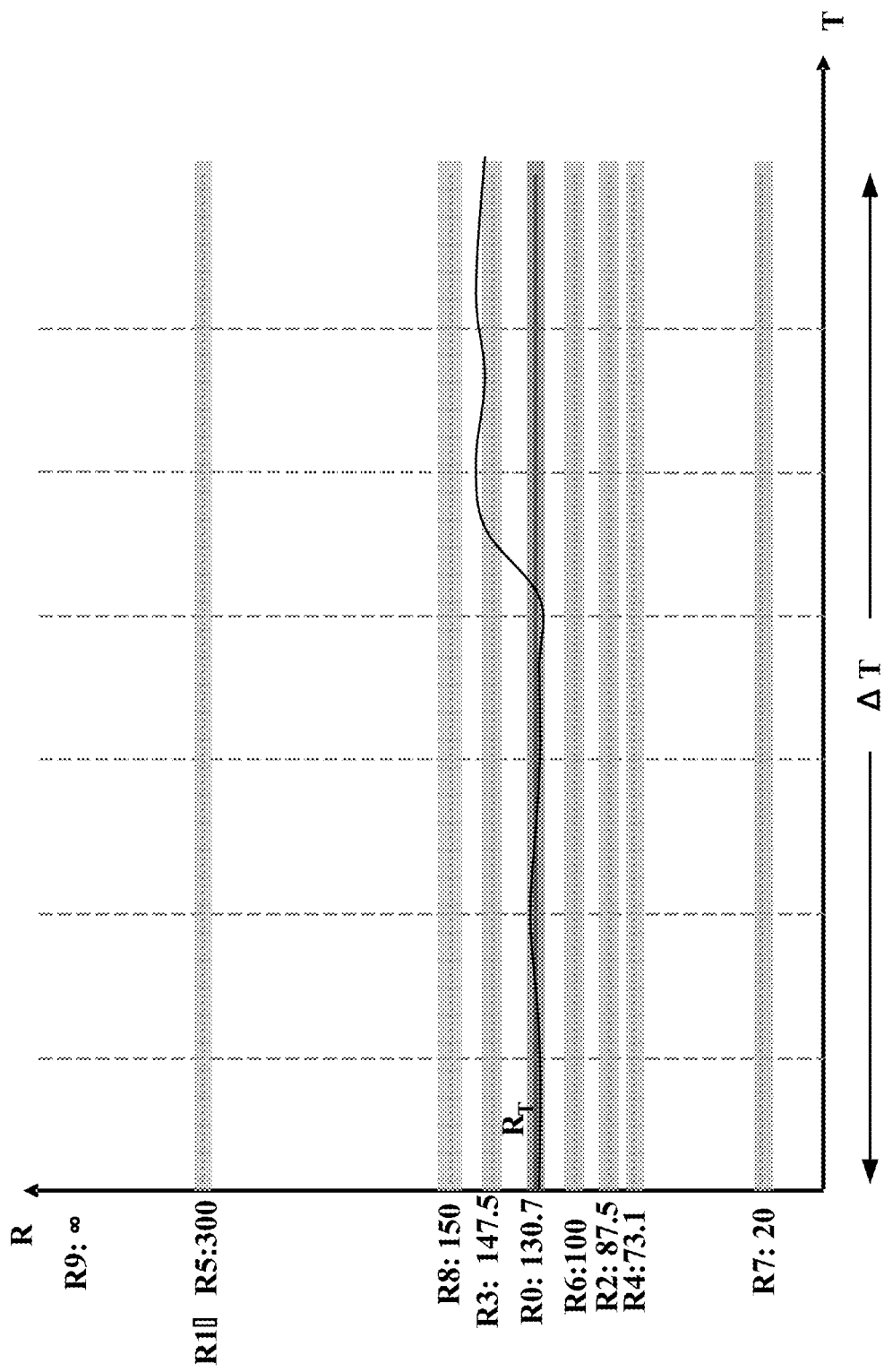
FIG. 5 depicts the variation of a total resistance value $R_T$ between the reference impedance range and the fault impedance ranges in the second embodiment of the present invention.
Figure 6:
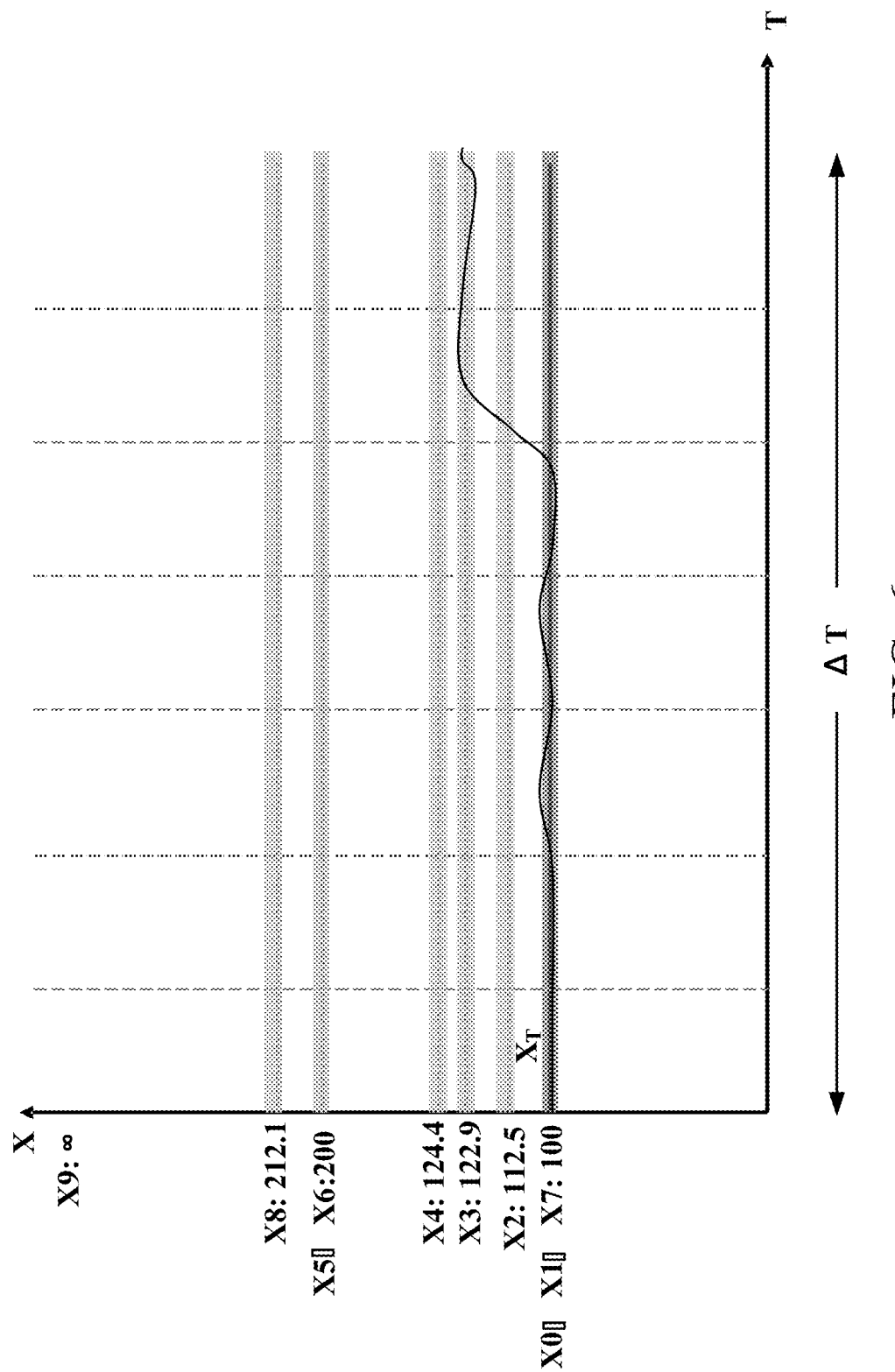
FIG. 6 depicts the variation of a total reactance value $X_T$ between the reference impedance range and the fault impedance ranges in the second embodiment of the present invention.

It shall be appreciated that the processor 33 may also determine the fault reason and the fault amount of the streetlamps 51, 53 by comparing the resistance value R and the reactance value X of the streetlamp loop 5. As shown in FIG. 5 and FIG. 6, R0~R9 represent the resistance values corresponding to the conditions in the table 1 respectively, and X0~X9 represent the reactance values corresponding to the conditions in the table 1 respectively. The way in which the processor 33 determines the fault reason and the fault amount of the streetlamps 51, 53 according to the total resistance value $R_T$ and the total reactance value $X_T$ measured by the measurer 35 can be readily appreciated by those of ordinary skill in the art on the basis of the above description, Table 1, FIGS. 5 and 6, so it will not be further described herein.

Figure 7:
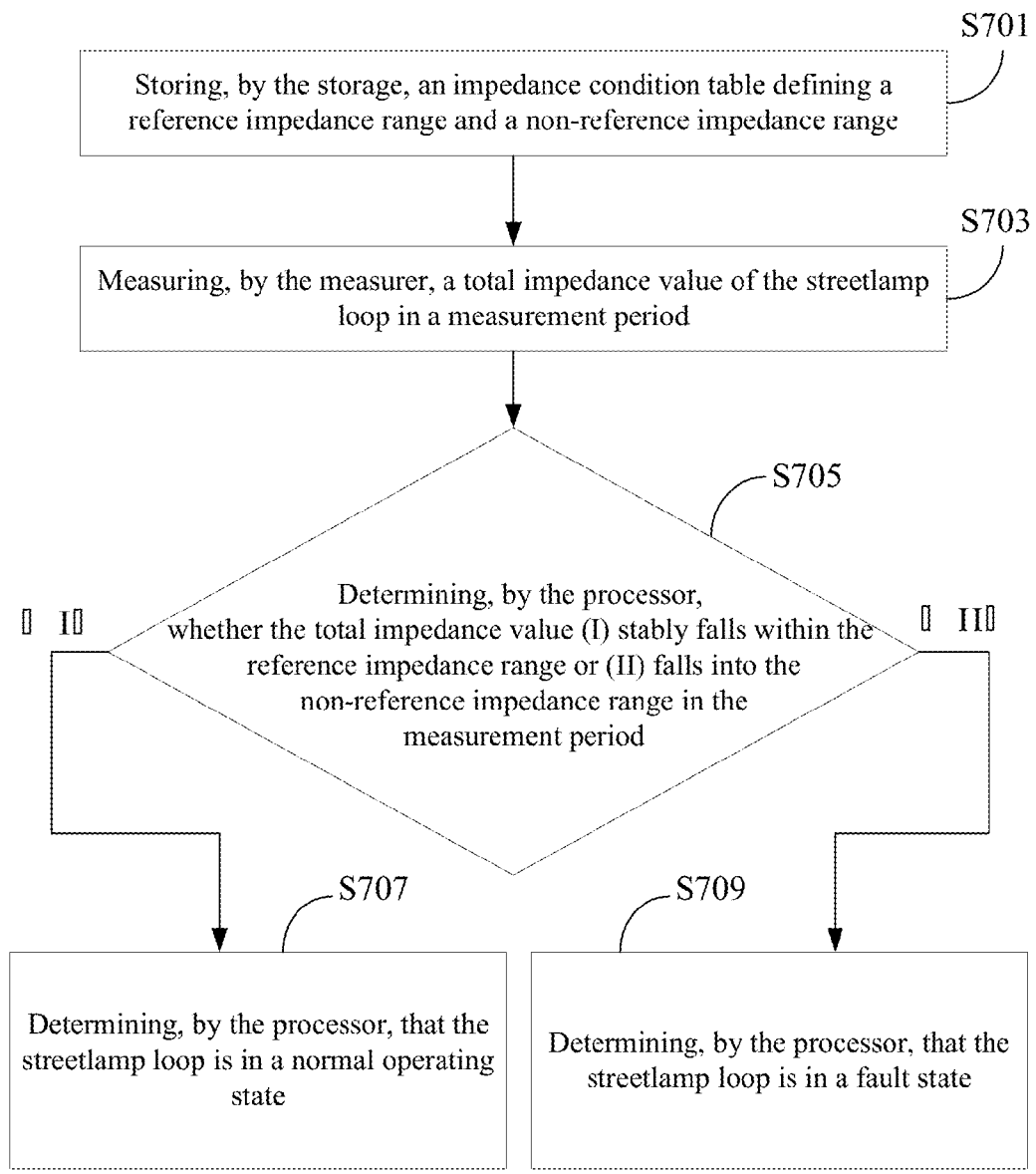
FIG. 7 is a flowchart diagram of a streetlamp fault detection method according to the third embodiment of the present invention.

The third embodiment of the present invention is as shown in FIG. 7, which is a flowchart diagram of a streetlamp fault detection method. The streetlamp fault detection method described in this embodiment can be used in a streetlamp fault detection apparatus, for example, the streetlamp fault detection apparatus 3 of the first embodiment and the second embodiment. The streetlamp fault detection apparatus is coupled to a streetlamp loop and comprises a storage, a measurer and a processor electrically connected to the storage and the measurer.

First, step S701 is executed to store, by the storage, an impedance condition table defining a reference impedance range and a non-reference impedance range. The reference impedance range is constituted by a reference impedance value and an error tolerance value. Then, step S703 is executed to measure, by the measurer, a total impedance value of the streetlamp loop in a measurement period. Next, step S705 is executed to determine, by the processor, whether the total impedance value (I) stably falls within the reference impedance range or (II) falls into the non-reference impedance range in the measurement period. In the case of (I), step S707 is executed to determine, by the processor, that the streetlamp loop is in a normal operating state. Conversely, in the case of (II), step S709 is executed to determine, by the processor, that the streetlamp loop is in a fault state.

On the other hand, after step S707, the streetlamp fault detection method may further comprise the step of modifying, by the processor, the reference impedance value according to the total impedance value. Furthermore, the streetlamp loop comprises a plurality of streetlamps. Each of the streetlamps comprises a light source, a ballast and a capacitor, and the non-reference impedance range comprises a plurality of fault impedance ranges. Each of the fault impedance ranges is constituted by a fault impedance value and an error tolerance value. In this case, after step S709, the streetlamp fault detection method further comprises the following steps of:

(d1) determining, by the processor, a fault reason and a fault amount of the streetlamps, wherein the fault reason is selected from a group consisting of a light source short-circuit fault, a light source open-circuit fault, a capacitor open-circuit fault, a ballast fault and an overpower fault;

(d2) determining, by the processor, that the fault reason includes at least one of the light source short-circuit fault, the light source open-circuit fault and the capacitor open-circuit fault if the total impedance value stably falls within one of the fault impedance ranges;

(d3) determining, by the processor, that the fault reason includes the ballast fault if the total impedance value varies between two of the reference impedance range and the fault impedance ranges; and (d4) determining, by the processor, that the fault reason includes the overpower fault if the total impedance value stably falls out of the fault impedance ranges.

In addition to the aforesaid steps, the detection method of this embodiment can also execute all the operations and functions set forth in the first and the second embodiments. The method in which this embodiment executes these operations and functions will be readily appreciated by those of ordinary skill in the art based on the explanation of the first and the second embodiments, and thus, will not be further described herein.

According to the above descriptions, by generating an impedance condition table to define a reference impedance range and a non-reference impedance range and by using a measurer to measure a total impedance value of a streetlamp loop, the streetlamp fault detection apparatus and the streetlamp fault detection method thereof of the present invention determine whether the streetlamp loop is in a normal operating state according to whether the total impedance value falls within the reference impedance range or the non-reference impedance range. Thereby, the streetlamp fault detection apparatus of the present invention can be installed into a distribution box of an area directly to determine the conditions of streetlamp loops, so that it is economical, easy to install and has real-time detection.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A streetlamp fault detection apparatus coupled to a streetlamp loop, the streetlamp fault detection apparatus comprising:
    a storage configured to store an impedance condition table defining a reference impedance range and a non-reference impedance range;
    a measurer configured to measure a total impedance value of the streetlamp loop in a measurement period; and
    a processor electrically connected to the storage and the measurer, and configured to
        determine that the streetlamp loop is in a normal operating state when the total impedance value stably falls within the reference impedance range in the measurement period, and
        determine that the streetlamp loop is in a fault state when the total impedance value falls into the non-reference impedance range in the measurement period;
    wherein
    the streetlamp loop comprises a plurality of streetlamps, and each of the streetlamps comprises a light source, a ballast and a capacitor,
    the non-reference impedance range comprises a plurality of fault impedance ranges,
    the processor is further configured to determine a fault reason and a fault amount of the streetlamps according to the fault impedance ranges when the streetlamp loop is in the fault state, and
    the fault reason is selected from the group consisting of a light source short-circuit fault, a light source open-circuit fault, a capacitor open-circuit fault, a ballast fault and an overpower fault.

2. The streetlamp fault detection apparatus as claimed in claim 1, wherein when the streetlamp loop is in the fault state, the processor determines that the fault reason includes at least one of the light source short-circuit fault, the light source open-circuit fault and the capacitor open-circuit fault when the total impedance value stably falls within one of the fault impedance ranges.

3. The streetlamp fault detection apparatus as claimed in claim 1, wherein when the streetlamp loop is in the fault state, the processor further determines that the fault reason includes the ballast fault when the total impedance value varies between two of the reference impedance range and the fault impedance ranges.

4. The streetlamp fault detection apparatus as claimed in claim 1, wherein when the streetlamp loop is in the fault state, the processor determines that the fault reason includes the overpower fault when the total impedance value stably falls out of the fault impedance ranges.

5. The streetlamp fault detection apparatus as claimed in claim 1, wherein the reference impedance range includes a reference impedance value and an error tolerance value.

6. The streetlamp fault detection apparatus as claimed in claim 5, wherein when the total impedance value stably falls within the reference impedance range in the measurement period, the processor further modifies the reference impedance value according to the total impedance value.

7. The streetlamp fault detection apparatus as claimed in claim 1, wherein each of the fault impedance ranges includes a fault impedance value and an error tolerance value.

8. A streetlamp fault detection method for use in a streetlamp fault detection apparatus, the streetlamp fault detection apparatus being coupled to a streetlamp loop and comprising a storage, a measurer and a processor electrically connected to the storage and the measurer, the streetlamp fault detection method comprising:
    storing, by the storage, an impedance condition table defining a reference impedance range and a non-reference impedance range;
    measuring, by the measurer, a total impedance value of the streetlamp loop in a measurement period;
    determining, by the processor, that the streetlamp loop is in a normal operating state when the total impedance value stably falls within the reference impedance range in the measurement period; and determining, by the processor, that the streetlamp loop is in a fault state when the total impedance value falls into the non-reference impedance range in the measurement period; wherein the streetlamp loop comprises a plurality of streetlamps, each of the streetlamps comprises a light source, a ballast and a capacitor, the non-reference impedance range comprises a plurality of fault impedance ranges, the method further comprises determining, by the processor, a fault reason and a fault amount of the streetlamps according to the fault impedance ranges when the streetlamp loop is in the fault state, and the fault reason is selected from the group consisting of a light source short-circuit fault, a light source open-circuit fault, a capacitor open-circuit fault, a ballast fault and an overpower fault.

9. The streetlamp fault detection method as claimed in claim 8, further comprising:

when the streetlamp loop is in the fault state, determining, by the processor, that the fault reason includes at least one of the light source short-circuit fault, the light source open-circuit fault and the capacitor open-circuit fault when the total impedance value stably falls within one of the fault impedance ranges.

10. The streetlamp fault detection method as claimed in claim 8, further comprising:

when the streetlamp loop is in the fault state, determining, by the processor, that the fault reason includes the ballast fault when the total impedance value varies between two of the reference impedance range and the fault impedance ranges.

11. The streetlamp fault detection method as claimed in claim 8, further comprising:

when the streetlamp loop is in the fault state, determining, by the processor, that the fault reason includes the overpower fault when the total impedance value stably falls out of the fault impedance ranges.

12. The streetlamp fault detection method as claimed in claim 8, wherein the reference impedance range includes a reference impedance value and an error tolerance value.

13. The streetlamp fault detection method as claimed in claim 12, further comprising:

modifying, by the processor, the reference impedance value according to the total impedance value when the total impedance value stably falls within the reference impedance range in the measurement period.

14. The streetlamp fault detection method as claimed in claim 8, wherein each of the fault impedance ranges includes a fault impedance value and an error tolerance value.

* * * * *